US005898383A

United States Patent [19]

Forsythe

[11] Patent Number: 5,898,383

[45] Date of Patent: Apr. 27, 1999

[54] SELF-SERVICE SHOPPING SYSTEM INCLUDING AN ELECTRONIC PRICE LABEL SYSTEM

[75] Inventor: Donald L. Forsythe, Dacula, Ga.

[73] Assignee: NCR Corporation, Dayton, Ohio

[21] Appl. No.: 08/709,020

[22] Filed: Sep. 6, 1996

[51] Int. Cl.[6] .............................. E04H 3/00; G06F 19/00

[52] U.S. Cl. .................. 340/825.35; 186/56; 364/478.13

[58] Field of Search ......................... 186/56; 340/825.35; 364/478.13, 479.01, 479.06, 479.07; 235/375, 381, 383; 705/17, 26

[56] References Cited

U.S. PATENT DOCUMENTS

| | | | |
|---|---|---|---|
| 4,071,740 | 1/1978 | Gogulski | 235/431 |
| 4,500,880 | 2/1985 | Gomersall et al. | 340/825.35 |
| 5,168,961 | 12/1992 | Schneider | 186/52 |
| 5,345,071 | 9/1994 | Dumont | 235/383 |
| 5,361,871 | 11/1994 | Gupta et al. | 186/61 |
| 5,374,815 | 12/1994 | Waterhouse et al. | 235/383 |
| 5,448,226 | 9/1995 | Failing, Jr. et al. | 340/825.35 |
| 5,461,561 | 10/1995 | Ackerman et al. | 364/401 |
| 5,595,264 | 1/1997 | Trotta, Jr. | 186/56 |

*Primary Examiner*—Michael Horabik
*Assistant Examiner*—Jean Jeanglaude
*Attorney, Agent, or Firm*—Paul W. Martin

[57] ABSTRACT

A self-service shopping system which uses an electronic price label (EPL) associated with an item to send a signal to a transaction processing system to record the selection of a product by a customer. An item selector card associated with a customer selects items for purchase. An item selector card reader reads the item selector card. The transaction processing system maintains a list of the selected items. The EPL system includes a plurality of EPLs associated with a plurality of items including the selected items. The EPLs communicate item identification information for the selected items to the transaction processing system.

16 Claims, 5 Drawing Sheets

SELF-SERVICE SHOPPING SYSTEM INCLUDING AN ELECTRONIC PRICE LABEL SYSTEM

BACKGROUND OF THE INVENTION

The present invention relates to electronic signage and self-service shopping systems, and more specifically to a self-service shopping system including an electronic price label (EPL) system.

EPL systems typically include a plurality of EPLs for each merchandise item in a store. EPLs typically display the price of corresponding merchandise items on store shelves and are typically attached to a rail along the leading edge of the shelves. EPLs may include a semi-transparent LCD. A store may contain thousands of EPLs to display the prices of the merchandise items. Information about the EPLs is typically maintained in an EPL data file. Price information displayed by the EPLs is obtained from a PLU file. The EPLs are coupled to a central server through a cable or wireless signal connection.

Retail stores have sought other ways to improve the efficiency of the checkout process. In one self-service shopping system, a store issues a shopper's card to a shopper. The shopper's card has a magnetic stripe. Upon entering the store, the shopper swipes the magnetic card through a card reader and retrieves a portable hand-held bar code scanner. The shopper scans items and places them in a shopping cart. The scanner includes a method of deselecting a selected product. The scanner also includes a display which can display a running total of the scanned items. To complete the shopping procedure, the shopper places the scanner in its charging station and receives a receipt. The shopper takes the receipt to a payment station and pays for the items.

This system suffers from the disadvantage that the store must provide and the shopper must carry a hand-held scanner. These scanners may be dropped or otherwise damaged by customers. Thus, this type of self-service shopping system can be expensive for the store.

Therefore, it would be desirable to provide a self-service shopping system that does not require the customer to carry expensive hardware, including a hand-held bar code scanner.

SUMMARY OF THE INVENTION

In accordance with the teachings of the present invention, a self-service shopping system including an electronic price label (EPL) system is provided.

The self-service shopping system includes an item selector card associated with a customer for selecting items for purchase, an item selector card reader for reading the item selector card, a transaction processing system which maintains a list of the selected items, and the EPL system. The EPL system includes a plurality of EPLs associated with a plurality of items including the selected items. The EPLs communicate item identification information for the selected items to the transaction processing system.

In the preferred embodiment, the item selector card also deselects a number of the selected items. The transaction processing system removes deselected items from the list. Finally, the EPL system communicates item identification information for the deselected items to the transaction processing system.

In the preferred embodiment, the item selector card reader is a bar code reader and the item selector card includes first and second bar code labels which select and deselect items for purchase.

It is accordingly an object of the present invention to provide a self-service shopping system that does not require expensive customer-carried items, such as bar code scanners.

It is another object of the present invention to provide a self-service shopping system which transmits item selections to a central computer using an electronic price label system.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
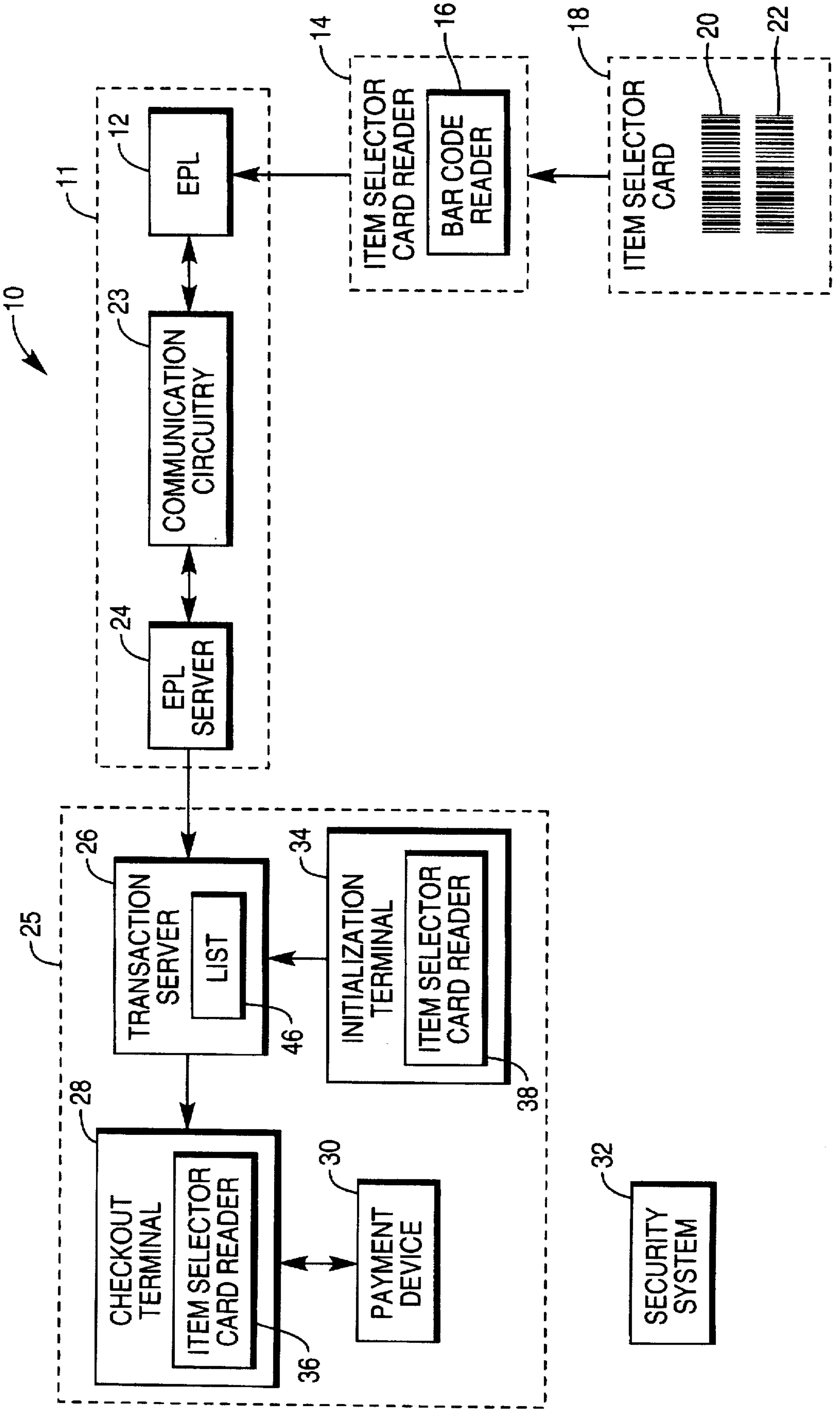
FIG. 1 is a block diagram of the self-service shopping system of the present invention.

Referring now to FIG. 1, system 10 includes electronic price label (EPL) system 11, item selector card reader 14, item selector card 18, transaction processing system 25, and security system 32.

EPL system includes EPL 12, communications circuitry 23, and EPL server 24.

EPL 12 displays price information about an item. EPL 12 preferably communicates with EPL server 24 using wireless RF methods.

Communication circuitry 23 routes messages between EPL 12 and EPL server 24.

EPL server 24 controls operation of the EPL system. During a normal mode of operation, EPL server 24 broadcasts price change and other messages addressed to predetermined EPLs. EPL 12 will act on the messages from server 24 if they are addressed to EPL 12. During an additional mode of operation, EPL server 24 routes item select and deselect messages to transaction server 26.

Item selector card reader 14 reads item selector card 18 and in the preferred embodiment includes bar code reader 16, although other types of sensors are also envisioned by the present invention including light sensors for noticing holes in the card and magnetic stripe readers for reading magnetic stripes on the cards.

Bar code reader 16 reads bar codes 20 and 22 on item selector card 18. Bar codes 20 and 22 contain card identification information and item selection and deselection commands. Bar code 20 contains an item selection command and bar code 22 contains an item deselection command. Bar codes 20 and 22 are preferably located at opposite ends of item selector card 18 so that only one of bar codes 20 and 22 can be scanned by bar code reader 16 at a time.

Item selector card reader 14 transmits a select item signal to EPL 12 when it reads bar code 20 and a deselect item signal to EPL 12 when it reads bar code 22. EPL 12 then transmits corresponding messages to EPL server 24 through communication circuitry 23.

Transaction processing system 25 includes transaction server 26, checkout terminal 28, payment device 30, and item selector card initialization terminal 34.

Transaction server 26 controls operation of transaction processing system 25 and provides price information for items in response to requests from checkout terminal 28. Price information is preferably maintained in the form of a price look-up (PLU) file.

Transaction server 28 also verifies that a card identification number is currently active and maintains a list 46 of selected items for each active card identification number.

Checkout terminal 28 downloads list 46, queries transaction server 26 for prices of selected items, and tallies the purchase total for the customer. Checkout terminal 28 includes item card selector reader 36 which reads item selector card 18 so that checkout terminal 34 can request the correct list 46 for download and so that checkout terminal 34 can instruct transaction server 26 to deactivate card 18.

Payment device 30 allows self-service customers to pay for the selected items on list 46. Payment device 30 is preferably a card reader, including a magnetic stripe reader and/or SMART card reader. Payment device 30 may mimic the functionality of card 18 by having select and deselect portions.

Item selector card initialization terminal 34 assigns item selector card 18 to a particular customer and notifies transaction server 26 that a card identification number is active. Item selector card initialization terminal 34 includes item selector card reader 38.

Security system 32 ensures that customers have selected all items in their shopping carts and shopping bags.

Figure 2:
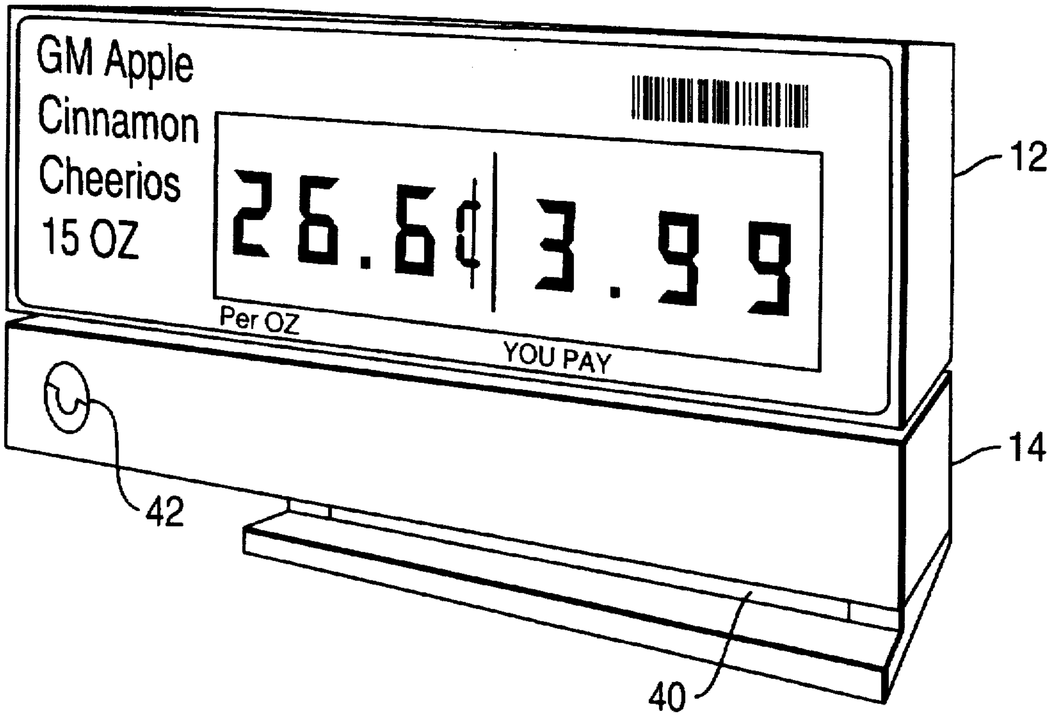
FIG. 2 is a perspective view of an electronic price label with an item selector card reader.

Turning now to FIG. 2, EPL 12 and item selector card reader 14 are shown as a single unit, which may be mounted on a shelf or shelf rail adjacent a corresponding item. EPL 12 and item selector card reader 14 may also be separate units.

Item selector card reader 14 includes slot 40 for receiving an end of item selector card 18 and an indicator light 42 which indicates that item selector card reader 14 has read item selector card 18.

Figure 3:
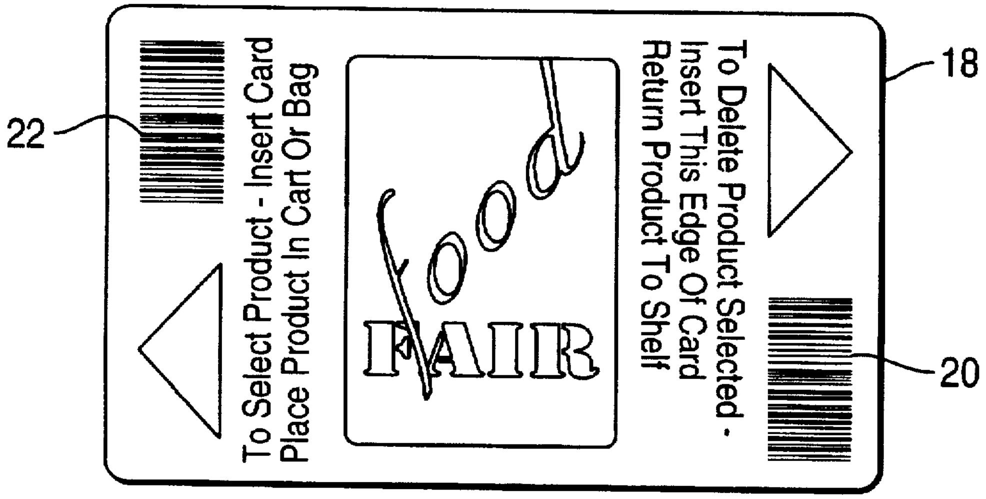
FIG. 3 is a front view of an item selector card.

Turning now to FIG. 3, item selector card 18 is shown. Item selector card 18 is preferably made of plastic, but other suitable materials are also envisioned. Bar codes 20 and 22 are embossed within the plastic at opposite ends of item selector card 18. Other information may also be embossed, such as the name of the store and directions for using item selector card 18.

Figure 4:
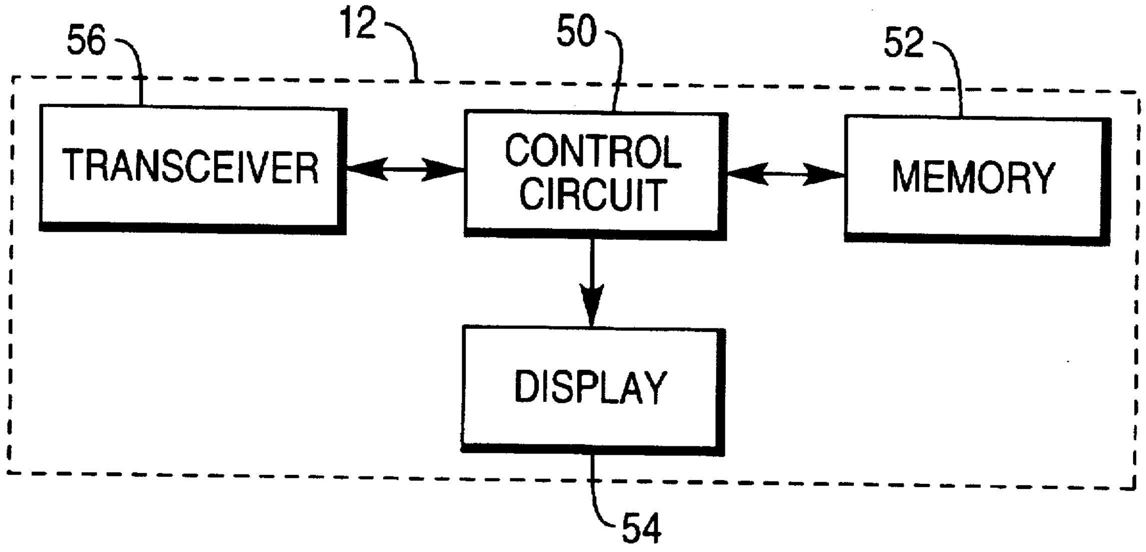
FIG. 4 is a block diagram of an electronic price label.

Turning now to FIG. 4, EPL 12 is shown in more detail. EPL 12 includes control circuit 50, memory 52, display 54, and transceiver 56.

Control circuit 50 determines whether messages from EPL server 26 are addressed to EPL 12 and executes instructions within the messages. Control circuit 50 acknowledges messages from EPL server 26 and transmits item select and deselect messages to EPL server 26. Control circuit 50 couples to item selector card reader 14.

Memory 52 stores price information received by control circuit 50.

Display 54 displays the price information stored within memory 52.

Figure 5A:
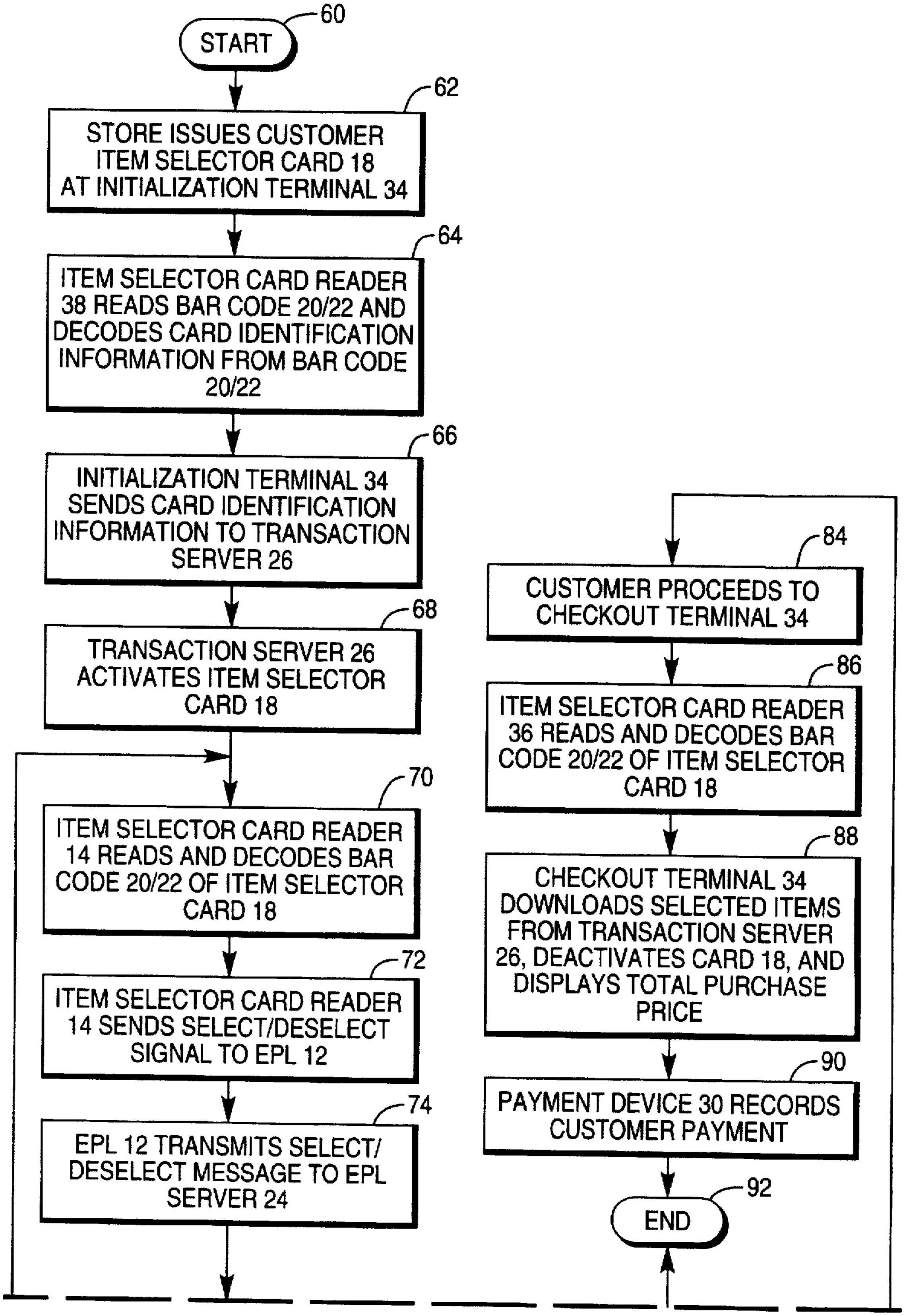
FIGS. 5A–5B are flow diagrams illustrating the method of operation of the system of the present invention.
Figure 5B:
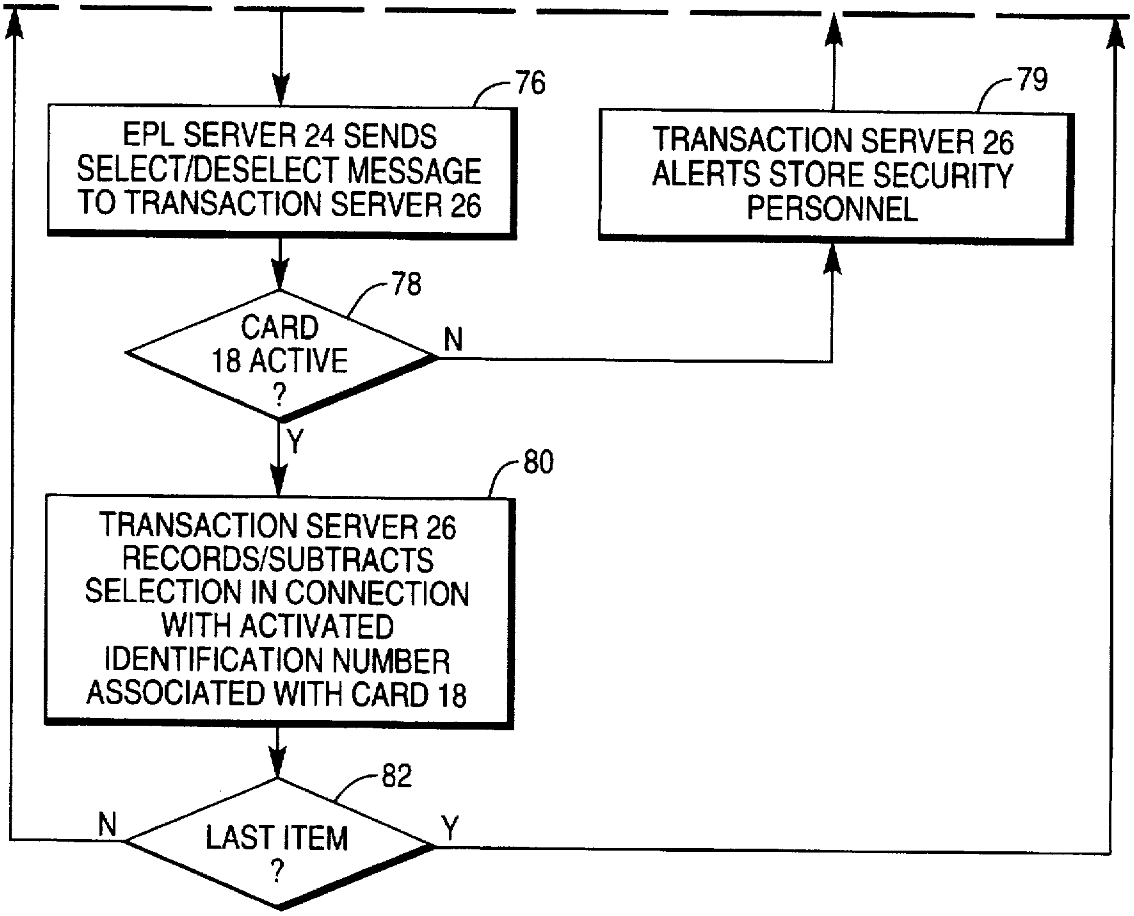

Turning now to FIG. 5, the operation of system 10 is illustrated in more detail beginning with START 60.

In step 62, store personnel issue item selector card 18 to a customer at initialization terminal 34.

Item initialization terminal 34 is preferably located near a store entrance where customers can pick up card 18 and a shopping cart.

In step 64, item selector card reader 38 reads one of bar codes 20 and 22 and decodes the card identification information from the bar code.

In step 66, initialization terminal 34 sends card identification information to transaction server 26.

In step 68, transaction server 26 activates item selector card 18 by setting up transaction list 46.

In step 70, item selector card reader 14 reads and decodes bar code labels 20 or 22 during a shopping evolution. At this point, the customer is traveling up and down aisles. The customer stops at an item and inserts card 18 into slot 40. If the customer is selecting an item for purchase, the customer inserts bar code 20 into slot 40. If the customer is deselecting an item, the customer inserts bar code 22 into slot 40.

It is an advantage of the system of the present invention that deselection need not immediately follow selection of an item.

In step 72, item selector card reader 14 sends a select or deselect signal to EPL 12.

In step 74, EPL 12 transmits a select/deselect message to EPL server 24.

In step 76, EPL server 24 sends the select/deselect message to transaction server 26.

In step 78, transaction server 26 determines whether card 18 is active. Card 18 must be activated before server 26 can add or subtract items from list 46.

If card 18 is not active, transaction server 26 alerts store security personnel in step 79 and the method ends in step 92.

If card 18 is activated, transaction server 26 records a new selection or subtracts a previous selection.

The customer continues to shop by returning to step 70. When the customer is finished shopping, the method proceeds from step 82 to step 84, in which the customer proceeds to checkout terminal 28.

Checkout terminal 28 is preferably located adjacent a store exit and is manned by a store employee to help customers and to provide security.

In step 86, item selector card reader 36 reads and decodes either of bar codes 20 and 22 of card 18 to obtain the identification information.

In step 88, checkout terminal 28 downloads the list 46 of selected items, obtains prices for the items from transaction server 26, deactivates card 18, and displays total purchase price.

In step 90, payment device 30 records customer payment. The customer then leaves the store.

In step 92 the method ends.

Throughout the method of FIG. 5, well-known security techniques may be employed to ensure that the customer selects each item that ends up leaving the store.

Although the present invention has been described with particular reference to certain preferred embodiments thereof, variations and modifications of the present invention can be effected within the spirit and scope of the following claims.

What is claimed is:

1. A self-service shopping system comprising:

an item selector card associated with a customer for selecting items for purchase;

an item selector card reader adjacent each of the items for reading the item selector card presented by customer during selection of the items by the customer;

a transaction processing system which maintains a list of the selected items; and an electronic price label (EPL) system, including an EPL adjacent each of the selected items, wherein the EPLs communicate item identification information for the selected items to the transaction processing system.

2. The system as recited in claim 1, wherein the item selector card also deselects a number of the selected items, wherein the transaction processing system removes deselected items from the list, and wherein the EPL system communicates item identification information for the deselected items to the transaction processing system.

3. The system as recited in claim 1, wherein the item selector card includes a bar code containing an item selection command and wherein the item selector card reader comprises a bar code reader for reading the bar code.

4. The system as recited in claim 2, wherein the item selector card includes a first bar code containing an item selection command and a second bar code containing an item deselection command, and wherein the item selector card reader comprises a bar code reader for reading the first and second bar codes.

5. The system as recited in claim 4, wherein the first and second bar codes are located on opposite ends of the item selector card.

6. The system as recited in claim 1, wherein the item selector card reader comprises an indicator light for indicating to the customer that the item selector card reader has successfully read the item selector card.

7. A method of recording a product for purchase by a customer comprising the steps of:

associating a product selector card with the customer;

establishing a list for the customer by a transaction computer;

reading a selection command from the product selector card by a product selector card reader mounted adjacent the product;

sending a signal to the transaction computer containing information associated with the product by an electronic price label mounted adjacent the product; and adding the product to the list by the transaction computer.

8. The method as recited in claim 7, further comprising the steps of:

reading a deselection command from the product selector card;

sending a signal to the transaction computer containing the information associated with the product by the electronic price label mounted adjacent the product; and subtracting the product from the list by the transaction computer.

9. The method as recited in claim 7, wherein the step of reading comprises the substep of:

reading and decoding a bar code label on the product selector card containing the selection command by a bar code reader in the product selector card reader.

10. A self-service shopping system comprising:

an item selector card associated with a customer for selecting items for purchase and for deselecting a number of the selected items, including a first bar code containing an item selection command and a second bar code containing an item deselection command;

an item selector card reader for reading the item selector card including a bar code reader for reading the first and second bar codes;

a transaction processing system which maintains a list of the selected items and removes deselected items from the list; and an electronic price label (EPL) system, including a plurality of EPLs associated with a plurality of items including the selected items, wherein the EPLs communicate item identification information for the selected and deselected items to the transaction processing system.

11. The system as recited in claim 10, wherein the first and second bar codes are located on opposite ends of the item selector card.

12. A self-service shopping system comprising:

an item selector card associated with a customer for selecting items for purchase including a bar code containing an item selection command;

an item selector card reader for reading the item selector card including a bar code reader for reading the bar code;

a transaction processing system which maintains a list of the selected items; and an electronic price label (EPL) system, including a plurality of EPLs associated with a plurality of items including the selected items, wherein the EPLs communicate item identification information for the selected items to the transaction processing system.

13. The system as recited in claim 12, wherein the item selector card reader comprises an indicator light for indicating to the customer that the item selector card reader has successfully read the item selector card.

14. A method of recording a product for purchase by a customer comprising the steps of:

associating a product selector card with the customer;

establishing a list for the customer by a transaction computer;

reading a selection command from the product selector card by a product selector card reader associated with the product, including the substep of reading and decoding a bar code label on the product selector card containing the selection command by a bar code reader in the item selector card reader;

sending a signal to the transaction computer containing information associated with the product by an electronic price label adjacent the product; and adding the product to the list by the transaction computer.

15. The method as recited in claim 14, further comprising the steps of:

reading a deselection command from the product selector card;

sending a signal to the transaction computer containing the information associated with the product by the electronic price label adjacent the product; and subtracting the product from the list by the transaction computer.

16. A self-service shopping system comprising:

an item selector card associated with a customer for selecting an item for purchase;

an item selector card reader mounted adjacent the item for reading the item selector card presented by the customer during selection of the item by the customer;

a transaction processing system which maintains a list of the selected item; and an electronic price label (EPL) system, including an EPL mounted adjacent the selected item, wherein the EPL communicates item identification information for the selected item to the transaction processing system.

* * * * *